TAKE-UP REEL DRIVE SYSTEM

Filed May 15, 1967 2 Sheets-Sheet 1

Inventor:
Robert J. Hammond.
By Brown, Jackson, Boettcher & Dienner
Attys.

Dec. 16, 1969 R. J. HAMMOND 3,484,057

TAKE-UP REEL DRIVE SYSTEM

Filed May 15, 1967 2 Sheets-Sheet 2

Inventor:
Robert J. Hammond,
By Brown, Jackson, Boettcher & Dienner
Att'ys.

United States Patent Office 3,484,057
Patented Dec. 16, 1969

3,484,057

TAKE-UP REEL DRIVE SYSTEM

Robert J. Hammond, Stevensville, Mich., assignor to V-M Corporation, Benton Harbor, Mich., a corporation of Michigan Filed May 15, 1967, Ser. No. 638,448
Int. Cl. G11b *15/32*
U.S. Cl. 242—208 10 Claims

ABSTRACT OF THE DISCLOSURE

A take-up reel drive system for reel-to-reel tape recorders wherein the take-up reel support is arranged to be engaged directly to the take-up reel motor through an inelastic, high friction clutch for immediate high speed take-up, without either excessive tape tension or loose tape.

CROSS-REFERENCES TO RELATED APPLICATIONS

For apparatus which is adapted to be associated with the present invention reference may be made to the copending application of John Arent, Ser. No. 623,717, filed Mar. 16, 1967 for Dampening Device for Tape Tension Levers; and to the copending applications of Lloyd Osborn, Ser. No. 602,333 filed Dec. 16, 1966, now Patent No. 3,367,596, for Reel Mounting and Reel Mounting Assembly, and Ser. No. 612,025 filed Jan. 26, 1967 for Braking Apparatus.

BRIEF SUMMARY OF THE INVENTION

This invention pertains to a take-up reel drive system in a tape transport system wherein rapid starts and stops are essential for proper recording. Such rapid starts and stops are particularly important in video recording or in making "instant movies" since the tape which travels past the head during the starting times will not be properly recorded and will appear as a period of no information during playback. In such a take-up reel drive system where the take-up reel must be accelerated to high speeds to provide, for example 30 inches a second tape speed, the motor for the take-up reel must be capable of delivering high torque, for example 40 to 50 inch ounces at low speed for reel starting, even though much lower torque, for example 2 to 3 inch ounces is all that is required for the play and fast-forward modes. With an arrangement wherein the motor is permanently coupled to the reel support, this can be achieved by voltage switching with tape tension. However, this would require a motor capable of high torque at least for short periods, a speed sensing device, a switching system and probably thermal overload protection. However, use of such equipment results in considerable expense.

It is an object of my invention to provide a less expensive drive system for tape recorders operating at high tape speeds.

It is another object of my invention to provide such a less expensive drive system by using a simpler, less expensive motor for the take-up reel and no control circuit for the motor.

In achieving these objectives I do not employ a structural arrangement in which the motor for the take-up reel is constantly connected to the reel support since the use of such a motor is expensive because it must be constructed so as to be capable of delivering high torque to get the reel moving from zero speed up to speeds such as 30 inches a second almost instantaneously, but having gotten the reel to such speed requires a control circuit so as to reduce the torque to a lower level which is all that is needed at that running speed. Instead, I employ a relatively inexpensive, readily available, less powerful motor but I do not have it constantly connected to the reel. I achieve the fast start up of the reel from zero speed to 30 inches per second, for example, by letting the motor run under no load when not in play or record mode thereby building up its speed and the needed rotational energy and then clutch it to the reel support by an inelastic high friction clutch which results in the motor-reel-tape combination being brought up to the desired speed almost instantaneously whether the reel is empty, partly filled with tape, or almost completely filled.

Knowing, for example, the weight, size and other characteristics of the reel and tape and the speed at which I desire to have the tape taken up by the reel, I can determine the inertia range of the reel and tape combination, which range will vary since the reel may be started up empty, or partly filled with tape or substantially filled with tape. Also having selected a motor with a sufficiently high no-load speed, I can use equation:

$$W_2 = \frac{I_1}{I_1 + I_2} \cdot W_1$$

$W_1$ for calculating for example, the desired inertia of the motor's rotor (where $W_2$ is the resultant speed of the motor-reel-tape combination, $I_1$ is the inertia of the rotor and associated elements, $I_2$ is the inertia of the reel and tape and associated elements, and $W_1$ is the no-load speed of the rotor and associated elements). With such equation I can also vary the components of the take-up system by varying $I_1$ and $I_2$ and $W_1$ while still maintaining the desired resultant speed of, for example, 30 inches per second. While I recognize that some energy will be dissipated as a frictional loss at the time the clutch is engaged, that loss can be allowed for since it can be calculated from the equation $$\text{Energy loss} = \frac{1}{2} \cdot \frac{I_1 \cdot I_2}{I_1 + I_2} \cdot W_1^2$$

Since in the selected system $I_1$ and $I_2$ will be stable and determinable, the calculation of energy loss is simple.

So, in achieving my objectives I provide a take-up reel drive motor whose no-load speed is considerably higher than the desired take-up reel speed and whose no-load rotational energy storage is greater than the rotational energy in the rotating reel-tape-motor combination, when turning together at the highest desired take-up reel speed, plus the easily calculable amount of energy lost at the moment of clutch engagement. The motor, when energized, is arranged to be engaged directly and substantially instantaneously to the take-up reel support through an inelastic high friction clutch.

I have found that it is desirable to select the rotational energy of the motor to slightly exceed the energy requirements needed to start up the take-up reel from zero speed and to bring it up to the speed desired within the range of speeds required for the varying amounts of tape on the reel. I then employ tape tensioners to limit tension due to over-acceleration which may occur when starting up a real and this results in gentle deceleration of the take-up reel to the proper speed. Preferably a tape tensioner is also employed on the output side of the supply reel in advance of the capstan.

DETAILED DESCRIPTION

Figure 1:
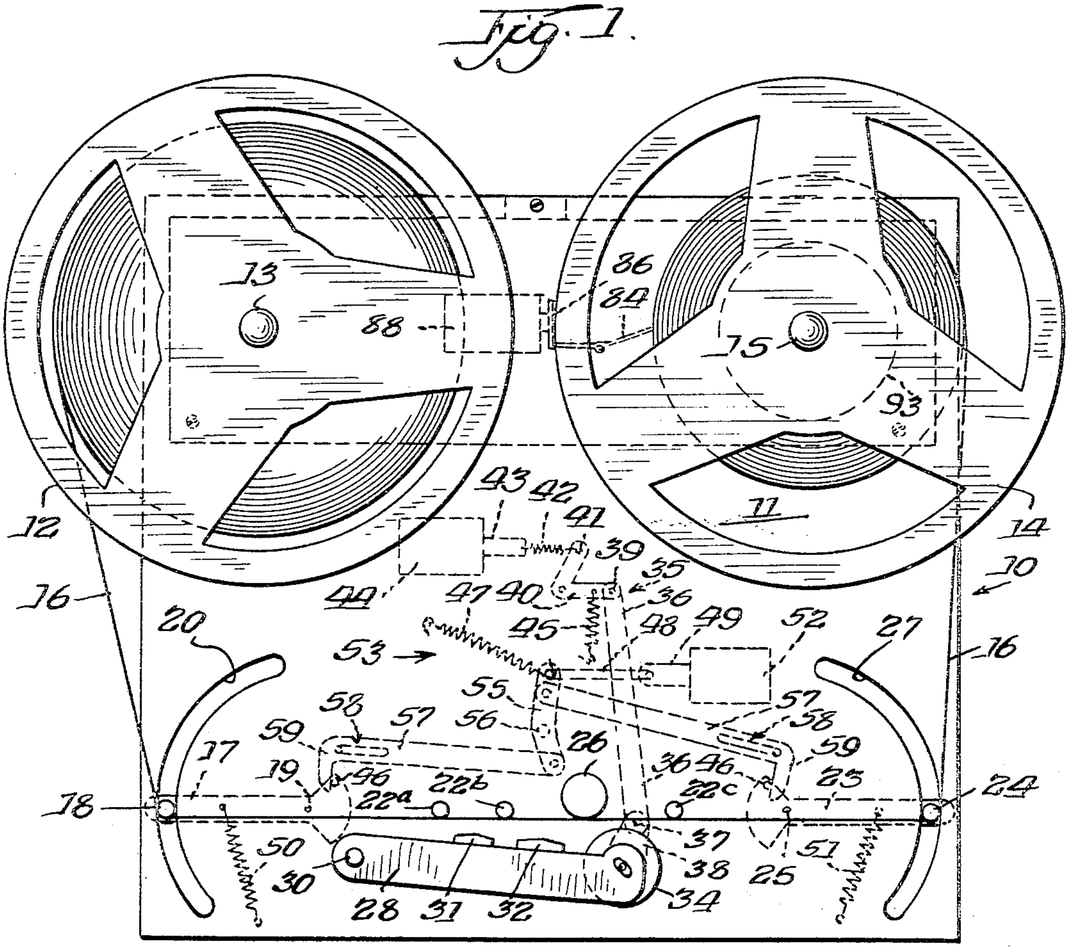
FIGURE 1 is a top plan view of a tape recorder in which my invention is adapted to be embodied, portions being shown diagrammatically, and with recorder in a non-driving condition.

In FIGURE 1 the tape recorder is designated generally by the reference numeral 10 and accessible above the top plate, or deck 11 are the supply reel 12 and take-up reel 14 through the centers of which extend the respective shafts 13 and 15. The tape 16 extends from the supply reel 12 to a guide element 18 on a spring-loaded, tape-tensioner arm 17 which is pivotally supported at 19 and lies beneath the deck 11. Guide 18 extends above the deck 11 through an arcuate slot 20 in that deck. Tape 16 extends from guide 18 to guides 22*a* and 22*b* which lie to the left of the motor driven capstan 26 (as viewed in FIGURE 1) and guide 22*c* which lies to the right of the capstan. A further guide element 24 is carried, on another spring-loaded, tape-tensioner arm 23 which is pivoted at 25 and lies beneath the deck 11. Guide element 24 similarly protrudes above deck 11 and is movable in an arcuate slot 27 in deck 11 and guides the tape 16 toward the supply reel 14.

As shown diagrammatically in FIGURE 1 a head for bar 28 is pivotally supported by pivot 30 for movement toward and away from the tape 16 and capstan 26. Head bar 28 carries heads 31 and 32 and a pressure roller 34 in customary manner. Actuating mechanism, indicated generally by the reference numeral 35, for moving the head bar 28 is shown as including a link 36 pivotally connected at one end at 37 to a lower extension 38 on head bar 28 and pivoted at its other end at 39 to one arm of a bell crank lever 40. The other arm of lever 40 is pivotally connected at 41 to a spring 42 which, in turn, is pivotally connected to the armature 43 of a solenoid 44. By the controls for the electrical circuit (not shown) solenoid 40 may be energized or not. When energized, the solenoid will attract the armature 43 and thereby cause the heads 31 and 32 on head bar 28 to be pulled into engagement with the tape 16 and will cause the pressure roller 34 to engage the tape 16 against the capstan 26. When the solenoid is not energized, a retraction spring 45 acting on the bell crank lever 40 causes link 36 to move the head bar 28 clockwise away from the tape 16 and capstan 26 to the position shown in FIGURE 1. Spring 41, connected between the armature 43 and bell crank lever 40, is much stiffer than retraction spring 45.

The tape-tensioner arm 17 is urged by spring 50 in a counter-clockwise direction and tape-tensioner arm 23 is urged by spring 51 in a clockwise direction, as viewed in FIGURE 1. To simplify threading of the tape past the capstan 26, head bar 28 and guides 18, 22*a*, 22*b*, 22*c* and 24 the spring-loaded tape-tensioner arm 17 and 23 may be brought to retracted positions by retracting means indicated generally by the reference numeral 53. The retracting means includes a bell crank lever 55, pivotally supported at 56, with each arm pivotally connected with a retraction link 57. Each link 57 is guided by a pin and guide-slot arrangement, indicated at 58, and has a bent end 59 which may engage a pin 46 which is carried on each tape-tensioner arm. One arm of bell crank lever 55 is spring loaded by a spring 47 in a counter-clockwise direction, by which spring the tape-tensioner arms are urged to their retracted positions as shown in FIGURE 1. That same arm of lever 55 is shown connected by a link 48 to an armature 49.

When solenoid 52 is energized to attract the armature 49 the retraction links 57 are moved away from the pins 46 and the tape-tensioner arms are then subject to the action of springs 50 and 51 and, of course, to tension placed on the tape during its movement. The retraction means 53 can be actuated in a cooperating manner with the actuating mechanism 35 for the head bar so that the tape-tensioner arms will be disassociated from the retraction means just prior to engagement of the pressure roller 34 with the rotating drive capstan 36. If desired, the actuation of the retraction means can be in accordance with the structure shown in the copending application above mentioned, Ser. No. 623,717, of John F. Arent.

Figure 2:
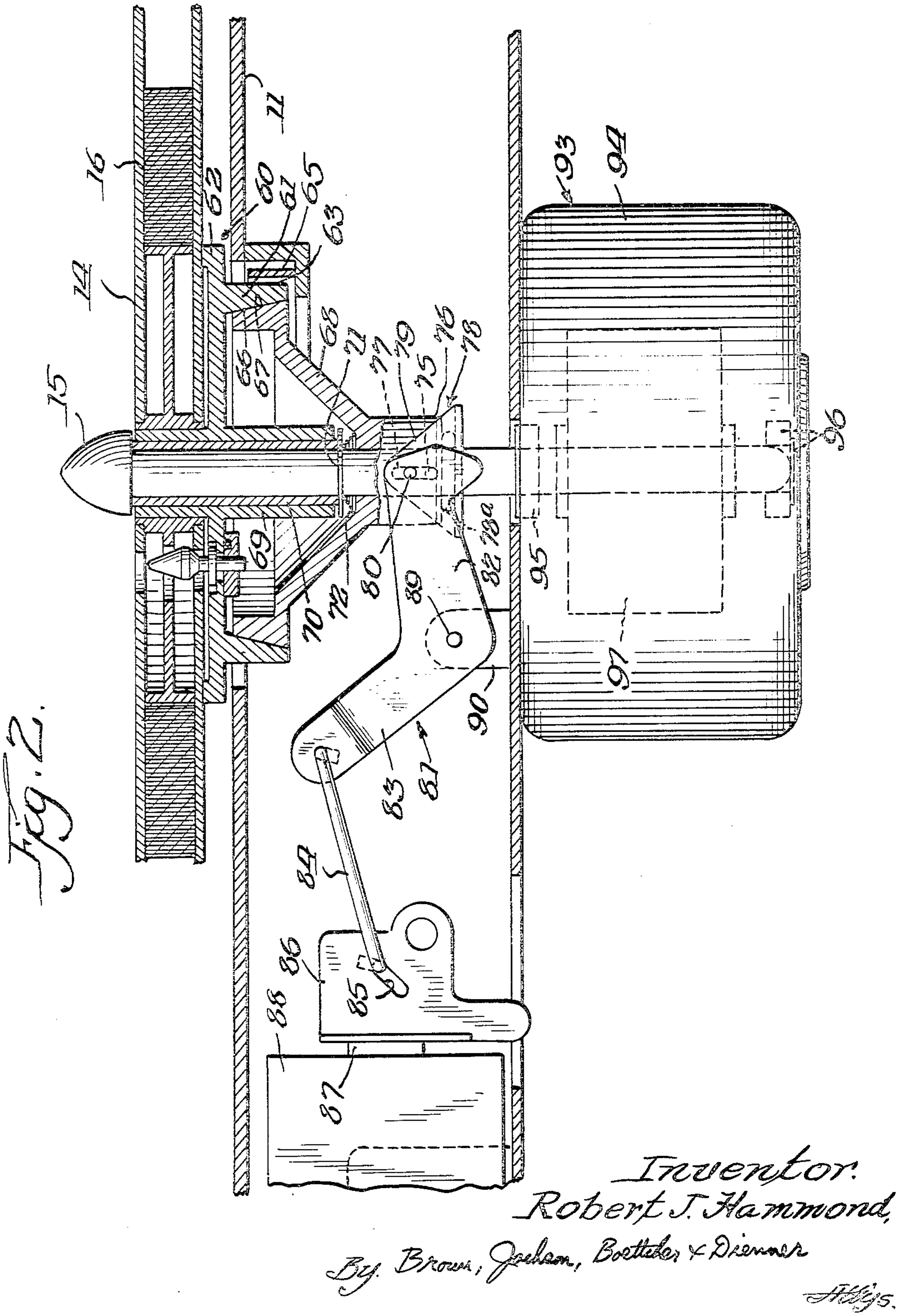
FIGURE 2 is a fragmentary view, on a larger scale, taken approximately on the line 2—2 of FIGURE 1, but showing the clutch in engaged position.

Referring to FIGURE 2, take-up reel 14, which is shown fragmentarily on larger scale, is seated on and drivingly connected to a reel-supporting structure which is indicated generally by the reference numeral 60. For details on the reel support 60 reference may be made to the above mentioned application, Ser. No. 602,333, of Lloyd Osborn. Hub 61 on reel support 69 extends downwardly from the horizontal reel support-plate 62 and the exterior surface 63 of the hub 61 is adapted to provide a braking surface for a brake band which is shown fragmentarily at 65. Details of a braking system usable in connection with my invention may be seen in the other above-mentioned application Ser. No. 612,025 of Lloyd Osborn. The inner surface of hub 61 is a truncated surface of a cone which is adapted to provide a clutch surface 66 engageable by a complementary, truncated conical clutch surface 67 of axially movable clutch member 68.

Reel support 60 is freely rotatable by its cylindrical bearing portion 69 on a bearing sleeve 70 which is disposed between bearing portion 69 and the motor drive shaft 15. A retaining washer 71 secured in an annular groove of shaft 15 sets a limit for the lower end of bearing sleeve 70 and also forms an abutment for the upper end of a clutch release spring 72 which encircles shaft 15 and has its lower end bearing against the movable clutch member 68, so as to urge the clutch member to disengaged position.

Clutch member 68 is drivingly connected to the drive shaft 15 by a drive pin 75 which is secured in the hub portion 76 of clutch member 68 and passes diametrically through an axially elongated slot 77 which extends through the drive shaft 15, thus permiting limited axial movement of the clutch member 68 into and out of engagement with clutch surface 66 of the hub 61. For moving the clutch member 68 into clutching engagement, there is provided a clutch operator 78 which is generally U-shaped and is pivotally connected adjacent the free ends of its opposite arms (e.g., see arm 79 and its pivotal connection 80) with arms of bell crank levers (such as lever 81 having arm 82) which levers at the ends of their other arms (such as arm 83) are connected to a common link 84. There is an opening in the bight portion of the U-shaped clutch operator which permits it to fit about the shaft 15 without contacting the shaft. A ball bearing 78*a* is disposed between clutch operator 78 and the lower side of the hub 76 of movable clutch member 68. Link 84 at its other end is guided in a slot 85 of a right angled mounting bracket 86 which is secured to an armature 87 which is associated with a solenoid 88. Bell crank levers 81 are pivotally mounted as at 89 on flanges 90 (only one shown) which are struck up out of the sub-deck 91. When the solenoid 88 is energized and attracts armature 87, movable clutch member 68 is raised into clutching engagement with the inner clutch surface 66 of hub 61.

A drive motor, indicated generally by the reference numeral 93, is shown diagrammatically. It has a housing 94 which supports bearings 95 and 96 for the drive shaft 15 which is directly connected with rotor 97 of motor 93. Through shaft 15 and drive pin 75, rotor 97 is connected to movable clutch member 68. Hub 61 of the reel support 60 and movable clutch member 68 are so shaped and formed of non-yielding material that they provide, for practical purposes, a high friction clutch which is an inelastic coupling. I have found that a hub and movable clutch member formed of aluminum to be very satisfactory. Motor 93 is constructed so that it has a no-load speed when energized which is considerably higher than the range of speeds needed for the take-up reel 14 when the tape recorder is in the play or record modes and the reel 14 is taking up tape 16. Also it is designed so that its rotational energy storage at no-load is greater than the rotational energy in the rotating reel of tape and its support plus the rotational energy stored in the motor when its rotor, shaft and clutch are revolving at the highest speed needed for the take-up reel.

OPERATION

Assume now that the tape recorder is turned on and that the tape tensioner arms 17 and 23 have been released from the control of the retracting means 53, and drive motor 93 has been energized and has arrived at its no-load speed. With the brakes released from the hubs of the supply and take-up reels 12 and 14 and with the capstan 26 rotating at its driving speed, the user puts the tape recorder in its record mode, by manipulating a button, switch or the like (not shown), whereupon the head bar 28 is moved to its operating position with the pressure roller 34 engaging the tape 16 against the capstan 26. At that time the supply reel 12 accelerates toward its proper speed due to the tape velocity at the capstan. Excessive tape tension is prevented by the tape-tensioner arm 17 which can provide a few inches of tape at about 10 ounces of tension which is adequate to accelerate the supply reel to speed.

At the same time solenoid 88 has been energized thereby attracting the armature to the left to the position shown in FIGURE 2 which thereby causes the rotaing clutch member 68 to engage the clutch surface 66 of the reel support 60. Some energy will be dissipated by slipping of clutch surfaces 66 and 67 but, except for that, the energy stored in the rotating mass of the motor, that is, in the roor 97, drive shaft 15 and movable clutch member 68 (which have been fully powered at no-load thereby providing a relatively high speed) is now used to accelerate the take-up reel, along with the support 60 and any tape which may be on the reel. The motor and reel combination now will rotate together at a new lesser speed representing the rotational energy formerly stored in the motor alone (minus frictional losses at time of engagement of the clutch). Since it is essential that this new speed be no lower than the desired speed of rotation of the take-up reel and since some tolerances are involved, it is intended to deliberately over-accelerate the take-up reel. Tape-tensioner arm 23 will accommodate not only any momentary excess tape delivered from the capstan when tape drive is initiated and before the take-up reel can be speeded up, but will also accommodate any subsequent tape tension resulting from the initial over-acceleration which is purposely provided, whether start-up of the reel involves an empty take-up reel or a nearly full reel. Since time is not related to the matter of energy transfer, reel starts on the order of 0.01 second can be made.

EXAMPLE

As an example of my proposed design, operated in conjunction with a commercially available ¼ inch magnetic tape, the weight of the reel without tape was approximately 8 oz. and when loaded with tape on a 3 inch hub and extending to an 8 inch diameter was approximately 16 oz. The empty take-up reel 14 and its associated support 60 had an inertia of 0.09 in. oz. sec.$^2$ and had a stored energy of 18 in. oz. when winding tape at 30 in./sec. on the 3 inch diameter hub. When the take-up reel was full of tape (approximately an 8 inch diameter) the inertia rose to 0.28 in. oz. sec.$^2$ but the energy contained in the nearly full reel when winding tape at 30 in./sec. was 7.7 in. oz. due to the lower speed of rotation at the 8 in. diameter.

I employed a commercially available relatively inexpensive six pole motor and added a small flywheel to increase the inertia. The motor's rotor 97 and its associated rotating elements (primarily the movable clutch member 68) had a weight of approximately 19 oz. and an inertia of .02 in. oz. sec.$^2$ and while rotating at a no-load speed of 115 rad./sec. had a stored energy of 132 in. oz. and a stored energy of 4 in. oz. at the empty take-up reel speed and .54 in. oz. at the substantially full take-up reel speed.

The clutch has been referred to as "high friction" and providing an "inelastic coupling." While, at the moment of engagement of clutch surfaces there will be some slight slippage, particularly if some lubricant is on the surfaces, the clutch is essentially inelastic in its characteristics. Also, the clutch can be regarded as a perfectly inelastic coupling if the frictional loss during engagement is high compared to energy stored in any torsional compliance. When determining the amount of stored energy desired in the motor when it is running at no-load speed, allowance can be made for any loss of energy at the clutch since the loss is determinable by the following computation:

$$\text{Energy loss} = \frac{1}{2}\,\frac{I_1 \cdot I_2}{I_1 + I_2} \cdot W_1^2$$

Where $I_1$ is the inertia of the rotor and associated elements $I_2$ is the inertia of the reel and associated elements $W_1$ is the no-load speed of the rotor and associated elements.

For the full reel there is therefore an energy loss of 123 in. oz. and for the empty reel an energy loss of 119 in. oz. These energy losses depend only upon the motor's no-load speed and the inertias which are stable and determinable.

As noted earlier, the resultant speed $W_2$ of the motor-reel-tape combination is also only determined by the inertias and the no-load speed:

$$W_2 = \frac{I_1}{I_1 + I_2} W_1$$

In my proposed design, the resultant reel speed was 20.9 rad./sec. for the empty reel as compared to the 20 rad./sec. speed required, and or the full reel 7.67 rad./sec. was the result rather than the 7.4 rad./sec. required. These slight excess speeds are readily accommodated by the tape-tensioner arm 23 without undue tension being placed on the tape and said arm quickly and gently de-accelerates the reel to the correct speed. It will be seen that the frictional engagement of the clutch does not enter into the above calculations nor does the time involved. However, the frictional torque preferably is in excess of 40 oz. in. to accelerate the reel in a sufficiently short time, such as would be suitable for video tape recording for example, but should not exceed approximately 200 oz. in. to prevent damage of components or excessive shaft wind up.

Figure 3:
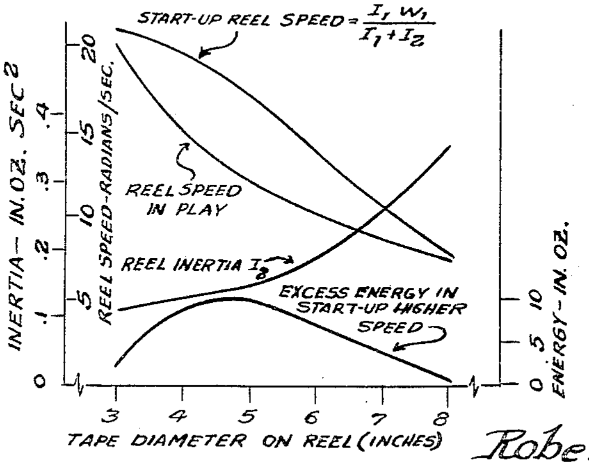
FIGURE 3 is a graph illustrating certain characteristics of the take-up reel drive system given as an example below.

FIGURE 3 is a graph illustrating certain characteristics of the example of my proposed design of take-up reel drive system, with the several curves having identifying legends, and may be referred to for a further understanding if desired.

I claim:

1. For use in driving a take-up reel of a tape recorder which has a driving means for driving the tape, the improvement comprising a reel support for securely supporting the take-up reel for rotation with the reel support, a driving motor for the reel-support for the take-up reel, said driving motor having a no-load speed higher than the highest desired speed of the take-up reel, when driven, and a no-load rotational energy storage greater than the rotational energy in the rotating reel plus the rotational energy in the motor when the motor and reel are rotating together as a unit at the highest desired take-up reel speed, and means for selectively engaging and disengaging the output of the motor operatively with respect to the reel support of the take-up reel while the motor is running.

2. The improvement of claim 1 wherein the means for selectively engaging and disengaging comprises a high friction inelastic clutch and actuating means for the clutch.

3. The improvement of claim 2 wherein the clutch comprises a pair of interfitting clutch elements having non-compliant, engageable surfaces.

4. The improvement of claim 1 together with a tape-tensioner which is in contact with the tape and disposed between the take-up reel and the driving means for driving the tape.

5. The improvement of claim 4 together with a tape-tensioner which is in contact with the tape and disposed between the supply reel and the driving means for driving the tape.

6. The improvement of claim 3 together with a tape-tensioner which is in contact with the tape and is disposed between the take-up reel and the driving means for driving the tape.

7. The improvement of claim 6 together with a tape-tensioner which is in contact with the tape and is disposed between the supply reel and the driving means for driving the tape.

8. The improvement of claim 2 wherein the rotational energy stored in the motor at no-load speed is selected so as to accommodate energy loss when the clutch is engaged and to initially accelerate the reel to a speed slightly higher than the highest desired speed of the reel.

9. A method of bringing a take-up reel of a tape recorder from zero speed substantially instantaneously to a desired driven speed to take-up tape delivered by a tape driving member which comprises energizable rotatable driving means to a no-load speed of rotation in excess of the desired driven speed of the reel at the highest desired take-up reel speed; providing energy storage in the rotatable driving means, at its no-load speed, greater than the energy of the reel plus the energy of the rotatable driving means when the driving means and reel are rotating together as a unit at the highest desired take-up reel speed; and rapidly connecting the rotatable driving means and reel together to rotate as a unit and thereby accelerating the reel to a speed above its desired driven speed; and slowing the reel to the desired speed through tension on the tape.

10. The method of claim 9 wherein the tape delivered by the tape driving member in passing to the take-up reel is guided in an angular path, and wherein during slowing of the reel through tension on the tape the angular path is yieldingly modified in response to tension in the tape to ease some of the tension therein.

References Cited

UNITED STATES PATENTS

| | | | |
|---|---|---|---|
| 2,700,513 | 1/1955 | Miles | 242—75.5 |
| 3,331,563 | 7/1967 | Roecks et al. | 242—55.12 |

LEONARD D. CHRISTIAN, Primary Examiner

U.S. Cl. X.R

242—75

PO-1050
(5/69)

UNITED STATES PATENT OFFICE
CERTIFICATE OF CORRECTION

Patent No. 3,484,057 Dated December 16, 1969

Inventor(s) Robert J. Hammond

It is certified that error appears in the above-identified patent and that said Letters Patent are hereby corrected as shown below:

Column 8, line 1 "Energizable" should read --energizing--

SIGNED AND
SEALED
JUN 9 1970

(SEAL)
Attest:

Edward M. Fletcher, Jr.
Attesting Officer

WILLIAM E. SCHUYLER, JR.
Commissioner of Patents